Figures 1, 2:
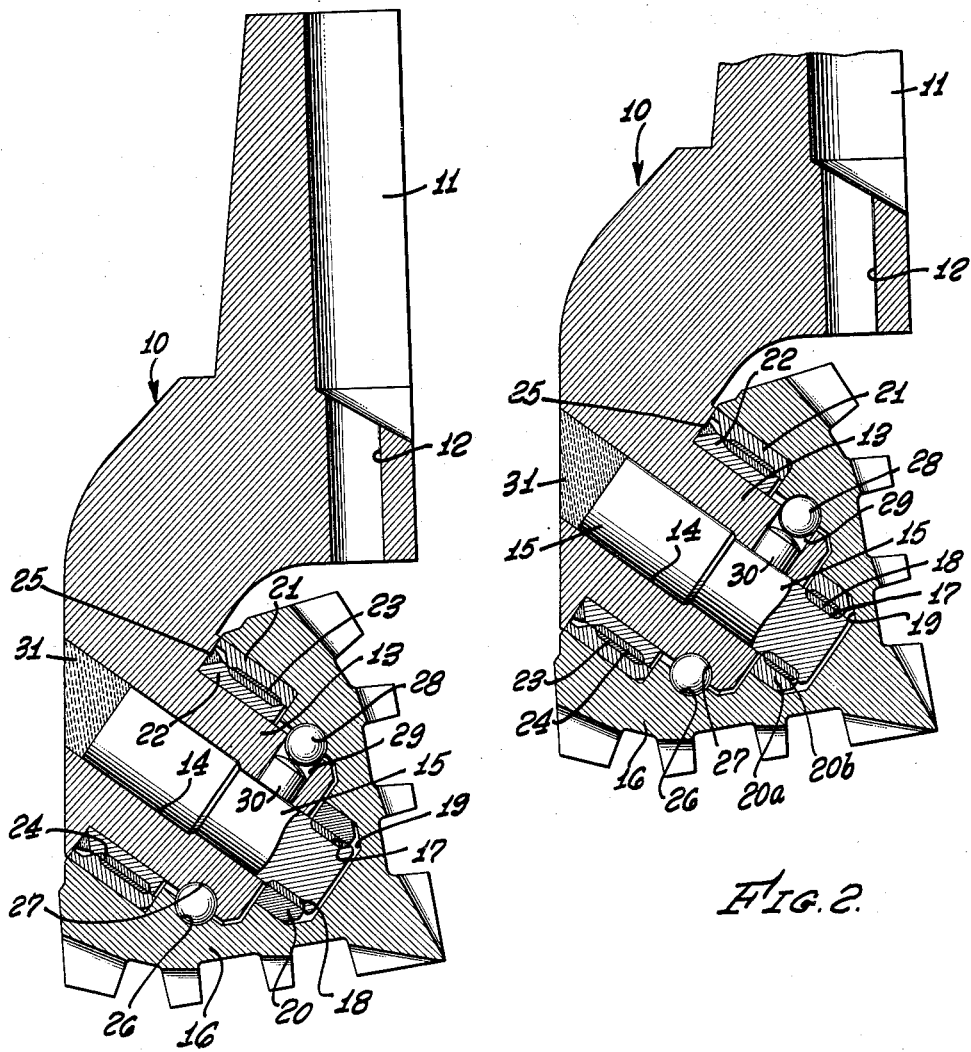

May 6, 1952   K. H. SWART   2,595,903
ROCK BIT RADIAL BEARING
Filed April 3, 1948

KENNETH H. SWART,
INVENTOR.

BY Hazard & Miller
ATTORNEYS.

Patented May 6, 1952

2,595,903

UNITED STATES PATENT OFFICE 2,595,903

ROCK BIT RADIAL BEARING

Kenneth H. Swart, Whittier, Calif., assignor to Security Engineering Co., Inc., Whittier, Calif., a corporation of California Application April 3, 1948, Serial No. 18,800

2 Claims. (Cl. 308—8.2)

This invention relates to improvements in the bearings employed on rock bits and while it has been primarily designed for use on that type of rock bit popularly known as a tri-cone bit, its use is not necessarily restricted thereto.

A primary object of the invention is to provide an improved bearing for carrying radial loads and which is of the friction type wherein the mutually engaging surfaces are formed of relatively hard metal. Recent technological advances in drilling practices in drilling oil and gas wells by rotary drilling apparatus requires the use of extremely heavy weights to be applied to the bit. It is desirable not only to impose very heavy weights on the bit but to rotate the drill pipe and the bit thereon at relatively high speeds. Heretofore rock bits of this general character have been designed employing roller bearings for carrying the radial loads applied to the cutters but when extremely heavy weights are applied together with the high rotary speeds, the conventional roller bearings used to carry the radial loads have not proved satisfactory. In order to prevent bearing failure where roller bearings have been employed it has generally been necessary to restrict the rotary speed to as low as 40 or 50 R. P. M. when extremely heavy weights such as 50,000 lbs. are imposed on an 8¾" bit, for example. It is desirable to be able to rotate the bit under such weight at a considerably higher speed. In order to accomplish this the present invention contemplates the use of a bearing for carrying the radial loads which employs a relatively hard metal such as Stellite or Stoodite. Where the radial load bearings are of the friction bearing type and are thus constructed, it is possible to impose very heavy weights on the bit and at the same time to rotate the drill pipe and the bit at the desired high speed.

More specifically an object of the invention is to provide an improved bearing for cutters of rock bits which can be easily and economically manufactured and assembled.

With the foregoing and other objects in view, which will be made manifest in the following detailed description and specifically pointed out in the appended claims, reference is had to the accompanying drawings for an illustrative embodiment of the invention wherein:

Figure 1 is a vertical section through one shank of a tri-cone bit illustrating the bearings embodying the present invention as having been incorporated therein; and Fig. 2 is a view similar to Fig. 1 but illustrating a slightly modified form of construction.

Referring to the accompanying drawings wherein similar reference characters designate simliar parts throughout, the shank 10 illustrated in Fig. 1 may be regarded as one of three shanks which are assembled together to form a tri-cone bit in accordance with conventional practice. On the interior of the shank there is a concavity 11 which forms a part of the circulation passage in the bit for discharging circulation mud through a port 12. On the lower end of the shank there is formed a journal 13 having an axial shouldered bore 14 formed therethrough. This bore is designed to receive a shouldered journal pin 15, and a generally conical toothed cutter 16 is receivable over the journal and journal pin.

In accordance with the present invention a groove 17 is formed on the portion of the journal pin 15 that projects from the journal and this groove is filled with hard metal indicated at 18. The cutter 16 is internally enlarged as at 19 around the groove 17 to receive a ring or bushing 20 which is also formed of hard metal. The hard metals referred to herein are of the type generally used for hard surfacing for the purpose of resisting wear or abrasion. Stellites and Stoodites deposited as by welding are quite suitable and in the preferred form of construction the metals forming the two opposed surfaces of any friction bearing are slightly dissimilar. Thus the ring or bushing 20 may be formed of a metal having a hardness of approximately 54 on the Rockwell C scale whereas the metal 18 may have a hardness of approximately 60 on the Rockwell C scale. By having unlike metals the bearing may conform to good bearing practice although the use of unlike metals is not absolutely essential. The metal 18 may be readily deposited in the groove 17 in the manner of welding and after having been deposited it may be ground. The ring or bushing 20 may be cast from metal forming it and internally ground to fit snugly about the metal 18. The bearing formed by the two metals 18 and 20 constitutes the inner bearing within the cutter designed to carry radial loads. An outer bearing which is also designed to carry radial loads is also employed. This bearing is formed of two bushings 21 and 22. Both bushings are grooved, the bushing 21 being internally grooved and the bushing 22 being externally grooved. These grooves are likewise filled with hard metal 23 and 24 and the same type of hard metals such as those previously described may be employed.

These metals may be deposited in their respective grooves as by welding and the mutually engageable surfaces can then be ground. The bushing 21 may be pressed into the cutter 16 or it may be welded thereto so that in effect it is rendered integral with the cutter. The bushing 22 may be pressed onto the journal 13 or it may be welded to the journal such as by a weld 25 to thus be in effect made integral with the journal. The ring or bushing 20 may also be pressed into the cutter so as to be held stationary with relation thereto.

Between the two radial bearings the cutter and the journal are formed with opposed races 26 and 27 designed to have a series of balls 28 positioned therein. These balls can be fed into the races through a radial aperture 29 that is drilled in the journal 13 and which communicates with the bore 14. After the balls have been fed into position the aperture 29 is closed by a plug 30 to prevent egress of the balls from between the races. The balls provide a thrust bearing carrying the thrust loads imposed on the cutter and also serve to lock the cutter against withdrawal from the journal. After the plug 30 has been inserted the journal pin 15 is inserted in the bore 14 and is fastened therein such as by welding on metal 31 which fills the outer end of the bore.

The construction illustrated in Fig. 2 is substantially the same as that previously described except that the inner radial bearing has its outer part 20a in the form of a bushing which is internally grooved to receive hard metal 20b that bears upon the hard metal 18 on the end of the journal pin 15. The hard metal 20b may be applied into the groove as by welding and its interior surface may then be ground to fit the hard metal 18.

From the above described construction it will be appreciated that an improved bearing for rotary rock bits is provided wherein both bearings designed to carry the heavy radial loads are formed of hard metal. I find from tests made with bits employing these bearings that the bit is capable of prolonged use even though subjected to extremely heavy loads and high speeds of rotation. When the bearings are thus constructed the bit is capable of operating much longer than a bit employing roller radial bearings, other conditions remaining the same. The use of bushings on the journal and on the interior of the cutter is highly preferable due to the difficulty in applying the hard surfacing metal directly to the interior of the cutter. While the hard metal theoretically could be applied directly to the interior of the cutter, as a practical matter it is very difficult to weld inside of the cutter due to the limited space and the fact that the flame in the case of the oxyacetylene torch is blown out of the open end of the cutter.

The type of thrust bearing formed by the balls as disclosed herein is conventional and other types of thrust bearings may be employed if desired. In the usual sitation the thrust load is relatively small as compared with the radial load and consequently the use of balls in most instances as the thrust bearing and as a means for locking the cutter onto the journal is not objectionable.

Various changes may be made in the details of construction without departing from the spirit and scope of the invention as defined by the appended claims.

I claim:

1. A rock bit comprising a shank having a journal, a journal pin extending through the journal so as to project inwardly therefrom, hard metal recessed in the projecting portion of the journal pin, a cutter enclosing the projecting portion of the journal pin and the journal, a bushing recessed in the cutter and presenting a hard metal surface opposed to the hard metal on the journal pin and cooperating therewith to form an inner friction type radial bearing, bushings on the journal and on the interior of the cutter, said bushings presenting hard metal opposed surfaces and cooperating to form an outer friction type radial bearing, and a thrust bearing between the radial bearings.

2. A rock bit comprising a shank having a journal, a journal pin extending through the journal so as to project inwardly therefrom, the projecting portion being of smaller diameter than the journal, a cutter rotatable about the journal and the projecting portion of the journal pin and enclosing the journal and projecting portion of the journal pin, a thrust bearing formed of balls between the journal and the cutter, said balls being insertable through the journal into position between races formed on the cutter and journal, the projecting portion of the journal pin presenting an annular surface of welded on hard metal forming one element of an inner radial friction bearing, a bushing in the cutter presenting an inner surface of hard metal opposed to said surface and forming the other element of the inner radial bearing, and opposed bushings on the journal and cutter outwardly of the thrust bearing presenting opposed annular surfaces of hard metal in mutual engagement forming an outer friction bearing.

KENNETH H. SWART.

REFERENCES CITED

The following references are of record in the file of this patent:

UNITED STATES PATENTS

| Number | Name | Date |
|---|---|---|
| 1,388,424 | George | Aug. 23, 1921 |
| 1,656,471 | Childs et al. | Jan. 17, 1928 |
| 1,747,394 | Scott | Feb. 18, 1930 |
| 1,885,266 | Johnson | Nov. 1, 1932 |
| 2,081,201 | Howard et al. | May 25, 1937 |
| 2,098,758 | Reed | Nov. 9, 1937 |
| 2,086,681 | Scott | July 13, 1937 |
| 2,192,697 | Scott | Mar. 5, 1940 |
| 2,184,129 | Stancliff | Dec. 19, 1939 |
| 2,297,192 | Reed | Sept. 29, 1942 |
| 2,339,161 | Fermier | Jan. 11, 1944 |